US011509139B2

(12) United States Patent  
Flannery et al.

(10) Patent No.: US 11,509,139 B2  
(45) Date of Patent: Nov. 22, 2022

(54) LOAD RE-BALANCING ON A MULTI-PHASE POWER SYSTEM

(71) Applicant: American Superconductor Corporation, Ayer, MA (US)

(72) Inventors: Patrick S. Flannery, Madison, WI (US); Robert McFetridge, Oak Island, NC (US)

(73) Assignee: American Superconductor Corporation, Ayer, MA (US)

( * ) Notice: Subject to any disclaimer, the term of this patent is extended or adjusted under 35 U.S.C. 154(b) by 297 days.

(21) Appl. No.: 16/865,961

(22) Filed: May 4, 2020

(65) Prior Publication Data

US 2021/0344199 A1 Nov. 4, 2021

(51) Int. Cl.
| | |
|---|---|
| H02J 3/26 | (2006.01) |
| H01F 38/14 | (2006.01) |
| H01F 38/18 | (2006.01) |
| H02K 11/00 | (2016.01) |
| H02K 19/26 | (2006.01) |

(Continued)

(52) U.S. Cl.  
CPC ............... H02J 3/26 (2013.01); H01F 38/14 (2013.01); H01F 38/18 (2013.01); H02J 3/14 (2013.01); H02J 3/44 (2013.01); H02K 11/0094 (2013.01); H02K 19/26 (2013.01); H02K 19/36 (2013.01); H02K 47/20 (2013.01); H02M 5/4585 (2013.01)

(58) Field of Classification Search  
CPC ....... H02J 3/14; H02J 3/26; H02J 3/44; H01F 38/14; H01F 38/18; H02K 11/0094; H02K 19/26; H02K 19/36; H02K 47/20; H02M 5/4585

USPC ......................................................... 323/355  
See application file for complete search history.

(56) References Cited

U.S. PATENT DOCUMENTS

| | | |
|---|---|---|
| 1,376,422 A | 5/1921 | Fortsecue |
| 2004/0100247 A1 | 5/2004 | Matsumoto et al. |

(Continued)

FOREIGN PATENT DOCUMENTS

| | | |
|---|---|---|
| EP | 2 672 603 A1 | 12/2013 |
| WO | WO 2017/029654 A1 | 2/2017 |

OTHER PUBLICATIONS

International Searching Authority/EP, International Search Report and Written Opinion of the International Searching Authority, Application No. PCT/US2021/028789, dated Jul. 12, 2021, 13 pages.

*Primary Examiner* — Hal Kaplan  
(74) *Attorney, Agent, or Firm* — Sunstein LLP

(57) ABSTRACT

A system for load balancing on a multi-phase power line connected to a single phase lateral power line, includes a contactor configured to selectively connect each phase of the multi-phase power line to the single phase lateral power line. There is a phase change device connected in parallel with the contactor and a controller. During the phase change state, the controller connects the input of the phase change device to the multi-phase power line and connects the output of the phase change device the single phase lateral power line. The controller causes the phase change device to output a voltage to the single phase lateral line initially aligned with the first phase and then rotated to align with the second phase and causes the contactor changes connection to the second phase of the multi-phase power line and disconnect the phase change device from the power lines.

24 Claims, 10 Drawing Sheets

(51) Int. Cl.
    *H02K 19/36*    (2006.01)
    *H02K 47/20*    (2006.01)
    *H02M 5/458*    (2006.01)
    *H02J 3/14*     (2006.01)
    *H02J 3/44*     (2006.01)

(56) References Cited

U.S. PATENT DOCUMENTS

2014/0001850 A1    1/2014  Guillemin
2018/0233898 A1*  8/2018  Tamir .................... H02H 5/10

* cited by examiner

LOAD RE-BALANCING ON A MULTI-PHASE POWER SYSTEM

FIELD OF THE INVENTION

This disclosure relates to a system for load re-balancing on a multi-phase power line connected to a single phase lateral power line and more particularly to such a system which enables automatic hot swapping of phases connected to the single phase lateral power line.

BACKGROUND OF THE INVENTION

Three-phase medium voltage distribution power grids include single phase lateral power lines which connect to various loads. The three-phase power lines fan out from a centralized substation, initially as three-phase feeder (or "trunk"), and then commonly branch off as single phase laterals further away from the substation. An example of such a three-phase distribution network 10 with multiple single phase laterals is shown in FIG. 1. The three-phase trunk 12 originates from distribution substation 14 and comprises three single-phase lines 16a (Phase A), 16b (Phase B), and 16c (Phase C), which are 120 degrees out of phase from each other. These single phase lines branch off to feed portions of the three-phase distribution network 10 via single-phase lateral feeds, such as lateral feeds 18a (Phase A), 18b (Phase B), and 18c (Phase C). Each lateral feed may power many different single-phase loads, including homes, businesses, and other users/producers of power.

Ideally, the three single-phase lines 16a, 16b, and 16c of three phase trunk 12 will be relatively balanced in terms of how much power is drawn from the loads connected to the respective single-phase lines. In extreme scenarios, however, peak loading on any single phase can be much higher than the other two phases, which can result in overloading of the entire three-phase trunk 12 and the three-phase assets at substation 14, including substation transformers, breakers, and relays. This is an inefficient allocation of total capacity, as two of the single phases may have extra capacity to accept the excessive loading on the overly burdened single-phase line.

Currently, the way that this situation is corrected is by dispatching a line crew to manually change the source phase for the overloaded lateral feed in order to re-balance the loads on the three phases. This is done at the location where the single-phase lateral branches off from the three phase trunk. Referring to FIG. 1, for example, lateral feed 18a may be removed from single-phase line 16a (phase A) at location 20 of the three-phase trunk 12 and reconnected to single-phase line 16b (phase B) at location 21 or single-phase line 16c (phase C) at location 22, depending on which would provide the most balanced arrangement. Manual re-balancing is costly to execute and disruptive to customers. Switching a single-phase lateral from one single phase line to another from requires a line crew to de-energize these lines and an outage for the customers of at least the laterals involved, and most likely an outage for customers of all three phases. For safety reasons, this manual re-balance cannot be executed with the lines energized or "hot".

With the growth of single phase distributed generation, such as residential solar/PV and highly mobile loads such as electric vehicles, the allocation of power (current) among the three phases (A, B, C) can vary significantly on a seasonal or even daily basis, which exacerbates the load balancing problem. Utilities can no longer accurately forecast the power allocation across the three phases with much accuracy. In the long term, manual re-balancing can be prevented with an upgrade of the current (power) rating of the three phase trunk and the three-phase substation, but at fairly significant cost.

A second issue involving single-phase laterals is the compromised uptime or availability for power delivery to critical single phase loads. Faults can occur anywhere on the three-phase distribution feeder, however, most faults are single phase in nature and do not require de-energizing all three of the phases. If a fault occurs on a phase with sensitive load anywhere on the phase other than the lateral containing the sensitive load, the lateral could potentially be swapped to one of the two remaining "healthy" phases in order to keep the sensitive load energized. Again, this is only presently possible presently via manual dispatch of a line crew to swap the lateral with the sensitive load to a remaining "healthy" phase.

Therefore, there exists a need for a system and method to swap a single phase lateral line (and the electrical loads it is feeding) from the nominal "source" phase to either of the other two "destination" phases without interruption of the voltage, i.e. hot swap the phases.

SUMMARY OF INVENTION

The benefits and advantages of the present invention over existing systems will be readily apparent from the Summary of the Invention and Detailed Description to follow. One skilled in the art will appreciate that the present teachings can be practiced with embodiments other than those summarized or disclosed below.

In one aspect, the invention includes a system for load balancing on a multi-phase power line connected to a single phase lateral power line having a phase rotating transformer having a stator and a rotor. The stator includes a plurality of primary coils, each primary coil configured to be connected to one phase of the multi-phase power line. The rotor includes a secondary coil configured to be connected to the single phase lateral power line and a rotary actuator operably connected to the rotor. There is a controller configured to cause the rotary actuator to rotate the rotor to selectively electromagnetically couple the secondary coil with each of the plurality of primary coils, so as to enable electrical connection of each phase of the multi-phase power line with the single phase lateral power line.

In other aspects of the invention, one or more of the following features may be included. The multi-phase power line may comprise three phases. The phase rotating transformer may comprise a wound field synchronous generator. The controller may be configured to cause the rotary actuator to rotate the rotor to selectively electromagnetically couple the secondary coil with each of the plurality of primary coils, while the plurality of primary coils of the stator are energized. The controller may be configured to rotate the rotary actuator across a range of +/−120 degrees. The rotary actuator may comprise a worm gear driven by an electric motor. The controller may be configured to rotate the rotary actuator and the secondary coil on the rotor from one of the primary coils to another of the primary coils in approximately 0.2 seconds or less. The system may further include a current in-rush limiting circuit disposed between the multi-phase power line and the primary coils of the stator of the phase rotating transformer. The system may also include a multi-phase by-pass circuit having a multi-phase to single-phase contactor device connected electrically in parallel to the phase rotating transformer.

In another aspect, the invention includes a method for load balancing on a multi-phase power line connected to a single phase lateral power line. The method comprising providing a phase rotating transformer having a stator and a rotor; wherein the stator includes a plurality of primary coils. Each primary coil is configured to be connected to one phase of the multi-phase power line and the rotor includes a secondary coil configured to be connected to the single phase lateral power line. The method includes providing a rotary actuator operably connected to the rotor and causing the rotary actuator to rotate the rotor to selectively change the electromagnetic coupling of the secondary coil from a first of the plurality of primary coils to a second of the plurality of primary coils, so as to change the electrical connection between the multi-phase power line and the single phase lateral power line from a first phase to a second phase.

In yet other aspects of the invention, one or more of the following features may be included. The multi-phase power line may comprise three phases. The phase rotating transformer may comprise a wound field synchronous generator. When the rotary actuator is caused to rotate the rotor to selectively change the electromagnet coupling of the secondary coil from a first of the plurality of primary coils to a second of the plurality of primary coils, the plurality of primary coils of the stator may be energized. The rotary actuator may be capable of causing the rotor to rotate across a range of +/−120 degrees. The rotary actuator may comprise a worm gear driven by an electric motor. The rotary actuator may cause the rotor and the secondary coil on the rotor to rotate from one of the primary coils to another of the primary coils in approximately 0.2 seconds or less. The method may further include disposing a current in-rush limiting circuit between the multi-phase power line and the primary coils of the stator of the phase rotating transformer. The method may also include disposing a multi-phase by-pass circuit having a multi-phase to single-phase contactor device electrically in parallel to the phase rotating transformer.

In a further aspect, the invention includes a system for load balancing on a multi-phase power line connected to a single phase lateral power line, the system. There is a contactor configured to selectively connect each phase of the multi-phase power line to the single phase lateral power line. In a normal operating state, the contactor is configured to connect a first phase of the multi-phase power line to the single phase lateral power line and during a phase change state, the contactor is configured to change connection from the first phase to a second phase of the multi-phase power line. There is a power electronics device, having an input and an output, connected in parallel with the contactor between the multi-phase power line and the single phase lateral power line. During the phase change state, the input is configured to be connected to the multi-phase power line and the output is configured to be connected to the single phase lateral power line. In the normal operating state, the input is configured to be disconnected from the multi-phase power line and the output is configured to be disconnected from the single phase lateral power line. There is a controller which, during the phase change state, is configured to connect the input of the power electronics device to the multi-phase power line and connect the output of the power electronics device the single phase lateral power line. The controller is also configured to cause the power electronics device to output a voltage to the single phase lateral line aligned with the first phase and cause the power electronics device to output the voltage to the single phase lateral line aligned with the second phase. The controller is additionally configured to cause the contactor to change connection from the first phase of the multi-phase power line to the second phase of the multi-phase power line and to disconnect the input of the power electronics device from the multi-phase power line and disconnect the output of the power electronics device from the single phase lateral power line.

In another aspect, the invention includes a method for load balancing on a multi-phase power line connected to a single phase lateral power line, the method comprising. The method includes providing a contactor configured to selectively connect each phase of the multi-phase power line to the single phase lateral power line. In a normal operating state, the contactor is configured to connect a first phase of the multi-phase power line to the single phase lateral power line and during a phase change state, the contactor is configured to change connection from the first phase to a second phase of the multi-phase power line. The method also includes providing a power electronics device, having an input and an output, connected in parallel with the contactor between the multi-phase power line and the single phase lateral power line. During the phase change state, the input is configured to be connected to the multi-phase power line and the output is configured to be connected to the single phase lateral power line. In the normal operating state, the input is configured to be disconnected from the multi-phase power line and the output is configured to be disconnected from the single phase lateral power line. During the phase change state the method includes connecting the input of the power electronics device to the multi-phase power line and connecting the output of the power electronics device the single phase lateral power line. The method includes causing the power electronics device to output a voltage to the single phase lateral line aligned with the first phase and causing the power electronics device to output the voltage to the single phase lateral line rotated to align with the second phase. The method additionally includes causing the contactor to change connection from the first phase of the multi-phase power line to the second phase of the multi-phase power line and to disconnect the input of the power electronics device from the multi-phase power line and the output of the power electronics device from the single phase lateral power line.

In yet a further aspect, the invention includes a system for load balancing on a multi-phase power line connected to a single phase lateral power line. The system includes contactor configured to selectively connect each phase of the multi-phase power line to the single phase lateral power line. In a normal operating state, the contactor is configured to connect a first phase of the multi-phase power line to the single phase lateral power line and during a phase change state, the contactor is configured to change connection from the first phase to a second phase of the multi-phase power line. There is a phase change device, having an input and an output, connected in parallel with the contactor between the multi-phase power line and the single phase lateral power line. During the phase change state, the input is configured to be connected to the multi-phase power line and the output is configured to be connected to the single phase lateral power line. In the normal operating state, the input is configured to be disconnected from the multi-phase power line and the output is configured to be disconnected from the single phase lateral power line. There is a controller which is, during the phase change state, configured to connect the input of the phase change device to the multi-phase power line and connect the output of the phase change device the single phase lateral power line. The controller is also configured to cause the phase change device to output a voltage to the single phase lateral line initially aligned with the first phase and then rotated to align with the second phase. The controller is further configured to cause the contactor to change connection from the first phase of the multi-phase power line to the second phase of the multi-phase power line and to disconnect the input of the phase change device from the multi-phase power line and disconnect the output of the phase change device from the single phase lateral power line.

In other aspects of the invention, the following feature may be included. The phase change device comprises one of a power electronics device or a phase rotating transformer.

In an additional aspect, the invention includes a method for load balancing on a multi-phase power line connected to a single phase lateral power line, the system comprising. The method includes providing a contactor configured to selectively connect each phase of the multi-phase power line to the single phase lateral power line. In a normal operating state, the contactor is configured to connect a first phase of the multi-phase power line to the single phase lateral power line and during a phase change state, the contactor is configured to change connection from the first phase to a second phase of the multi-phase power line. The method includes providing a phase change device, having an input and an output, connected in parallel with the contactor between the multi-phase power line and the single phase lateral power line. During the phase change state, the input is configured to be connected to the multi-phase power line and the output is configured to be connected to the single phase lateral power line. In the normal operating state, the input is configured to be disconnected from the multi-phase power line and the output is configured to be disconnected from the single phase lateral power line. During the phase change state the includes connecting the input of the phase change device to the multi-phase power line and connecting the output of the phase change device the single phase lateral power line. The method additionally includes causing the phase change device to output a voltage to the single phase lateral line initially aligned with the first phase and then rotated to align with the second phase. The method also includes causing the contactor to change connection from the first phase of the multi-phase power line to the second phase of the multi-phase power line and disconnecting the input of the phase change device from the multi-phase power line and disconnect the output of the phase change device from the single phase lateral power line.

In other aspects of the invention, the following feature may be included. The phase change device comprises one of a power electronics device or a phase rotating transformer.

BRIEF DESCRIPTION OF THE FIGURES

Embodiments of the present disclosure will now be described, by way of example only, with reference to the attached Figures, wherein.

DETAILED DESCRIPTION OF THE INVENTION

Figure 1:
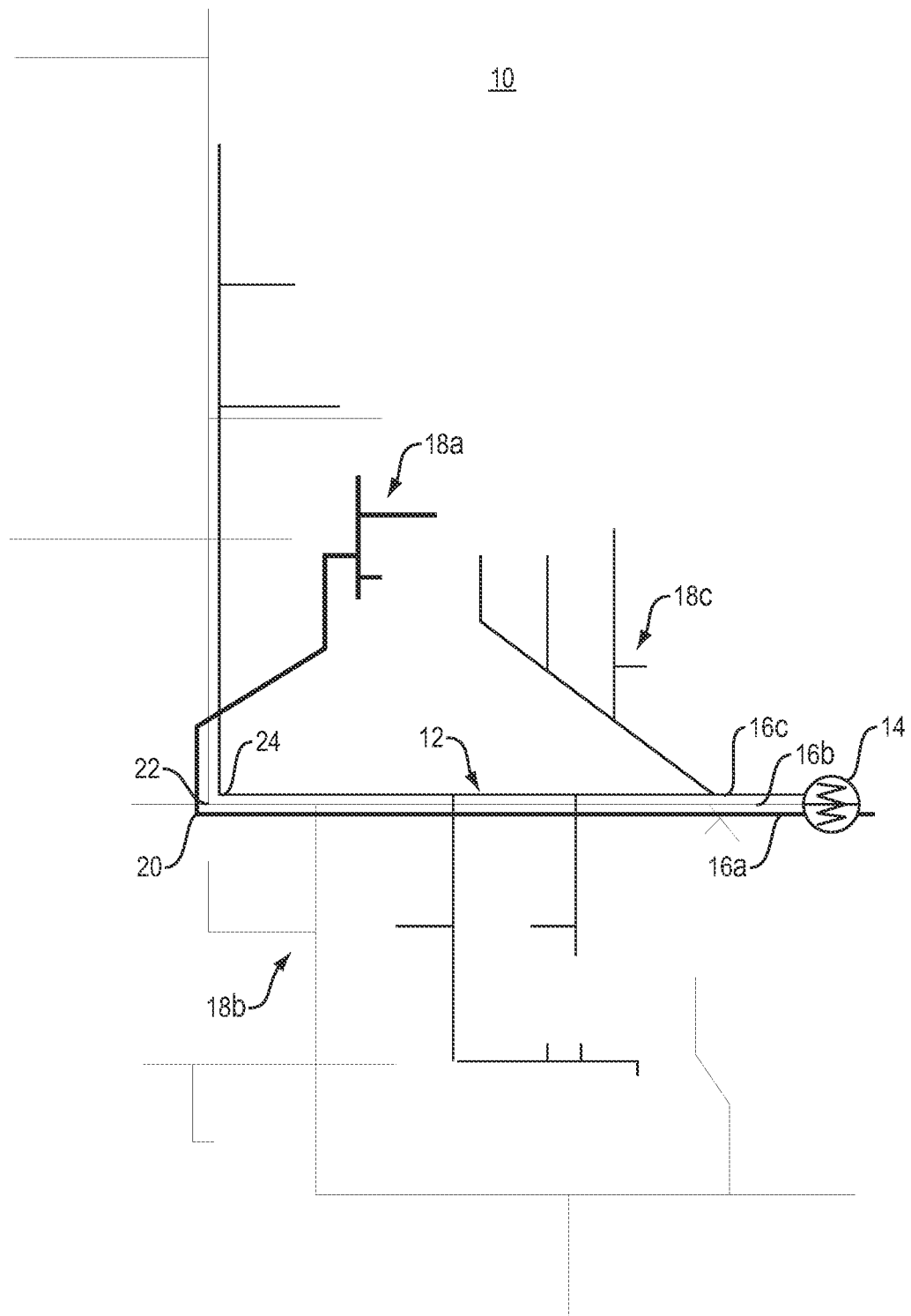
FIG. 1 is a line diagram of an exemplary three-phase distribution network with multiple single-phase laterals.

The disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure. Moreover, it is noted that like reference numerals represent similar parts throughout the several views of the drawings.

The invention described herein provides the ability to "hot-swap" the source voltage for a given single phase lateral on a medium or low voltage power distribution grid. In one application, this capability would allow utilities to dynamically re-balance the three phase currents drawn from the three phase "trunk" and substation equipment. It would increase availability or uptime for critical single phase loads by connecting such loads to a healthy (energized) single phase source in the event of an upstream single phase fault on the phase originally feeding the lateral. Additionally, the invention may be applied where other single phase loads exist (e.g. industrial customers) that require high availability.

The ability to hot swap the entire single phase lateral line (and the electrical loads it is feeding) from the nominal "source" phase to either of the other two "destination" phases provides for correction without interruption of the voltage. The approach described herein further enables the voltage to maintain a smooth, near-sinusoidal shape during the swap event to prevent "load drop"—i.e. motors and other devices from tripping offline if the lateral voltage "jumps" very abruptly from source to destination voltage. The invention additionally provides for the continued supply (or absorption) of real power to the loads on the lateral phase during the swap event. The system described herein can be sited outside of a substation, at the point where the single phase lateral branches from the three phase trunk (i.e. along the distribution feeder), and it can be done with low capital and maintenance costs.

Figure 2A:
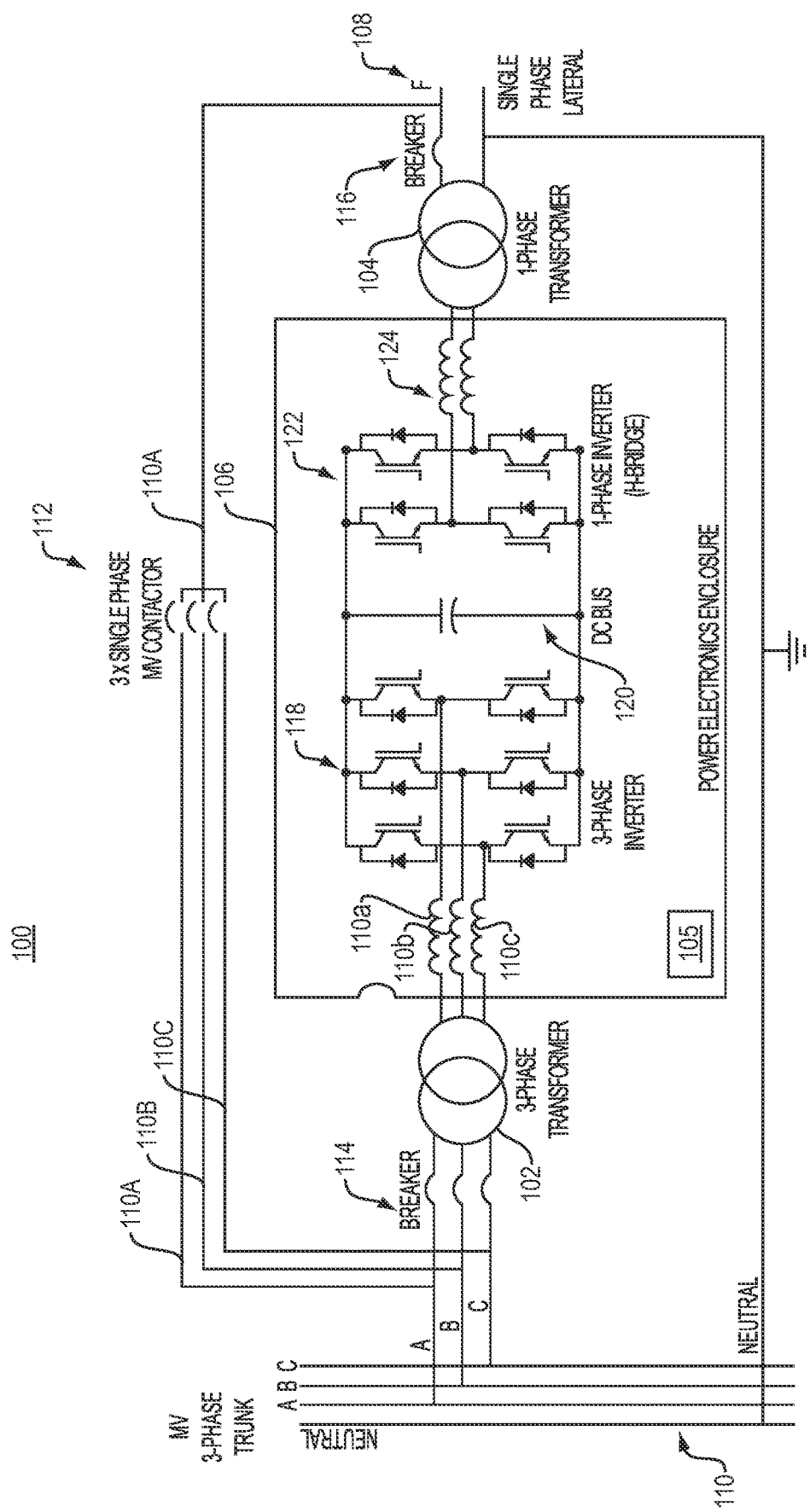
FIG. 2A is a schematic diagram of the load re-balancing system according to an embodiment of the invention using a power electronic converter.
Figure 2B:
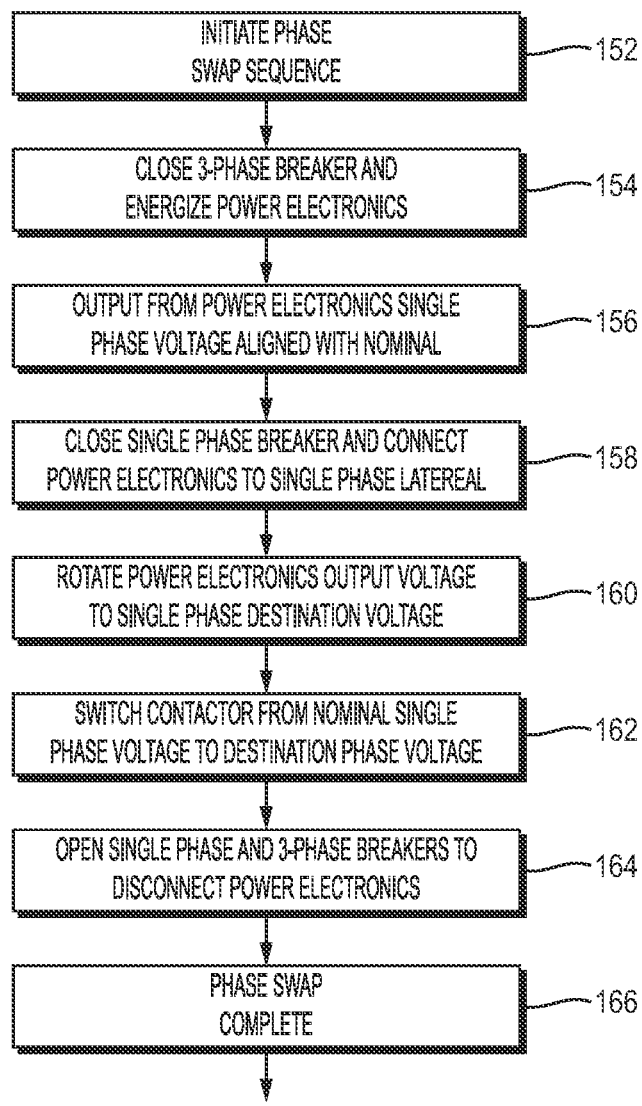
FIG. 2B is a flow chart illustrating the operation of the control system of the load re-balancing system of FIG. 2A.

One potential way to implement a system and method to hot swap a single phase lateral line from the nominal "source" phase to another phase of the three-phase trunk without interruption, is described below with regard to FIGS. 2A and 2B. Shown in FIG. 2 is a 3-phase to 1-phase AC-DC-AC power converter system 100, with medium voltage connection transformers 102 and 104 at each AC interface. A power electronics enclosure 106 of power converter system 100 is normally bypassed, and the single-phase lateral line 108 is connected to the desired phase of three-phase trunk 110 via one of the MV contactors 112. For example, single phase lines 110A, 110 B and 110C of three-phase trunk 110 are connected to contactor 112 and one of the single phases, in this case phase 110A, is connected to single phase lateral line 108. If it is determined that single phase line 110A is overloaded and the three-phase trunk should be re-balanced, the phase connected to single phase lateral line 108 may be changed from phase 110A to either phase 110B or 110C, depending on which phase has sufficient capacity. The phases could be changed manually by a line crew by changing the contactor 112 connections but, as described above, there are significant disadvantages to this approach.

Instead, the phase change may be facilitated using the 3-phase to 1-phase AC-DC-AC power converter system 100 under the control of system controller 105. In this embodiment, system controller 105 is positioned inside of power electronics enclosure 106; however, it may alternatively be positioned next to, but outside of the enclosure, or even at a remote location; in each case, it would be in communication with and in control of the various system components, including contactor 112, breakers 114 and 116, and power electronics enclosure 106. System controller 105 may be in communication with a network control system to instruct the controller to re-balance the loads of three-phase trunk 110 by changing the phase feeding the single phase lateral 108. Or, controller 105 may operate autonomously to change the phase connected to the single phase lateral 108, by assessing loading on the phases of three-phase trunk electrical loads on the single phase lateral 108, based on signals provided by sensors directly to the controller 105.

When a phase swap is desired/required, controller 105, as shown in step 152 of flow chart 150, initiates the phase swap sequence. In the current state (i.e. before phase swap), one of the 3 single phase contactors in contactor 112 is in the closed position, providing a nominal connection of the output line 108 to one of the three phases, in this example it is connected to A phase from the trunk 110A. The swap process proceeds to step 154 when controller 105 causes power electronics enclosure 106 to be energized by closing three phase breaker 114. When breaker 114 is closed, 3 phase transformer 102 is energized and it steps down trunk phase voltages 110A, 110B, and 110C, from typical distribution voltage levels (e.g. 12,470 volts AC) to provide low voltage (e.g. 600 volts) phases 110a, 110b, and 110c to the 3 phase inverter 118 within power electronics enclosure 106. The three phase inverter rectifies the three phase voltages and outputs DC voltage on DC bus 120. It should be apparent to those skilled in the art that the three phase inverter 118 could be replaced by a three phase rectifier with a combination of diodes and/or thyristors.

The DC on bus 120 is then chopped by the single phase inverter 122 to create the single phase AC voltage on output line 124. At step 158, the controller causes the output to be initially aligned with the nominal "source" voltage (i.e. single phase line 110A) on the single phase lateral line 108. Thus, on output line 124 may be produced low ac voltage 110a, which is then stepped up using single-phase transformer 104 to produce single phase voltage 110A on single phase lateral line 108, when single phase breaker 116 connects the output of transformer 104 to lateral line 108, step 158. Then, at step 160, the single phase voltage on output 124 may be rotated by single phase inverter 122 to produce the "destination" phase, i.e. single phase 110b or 110c. At step 162 the controller causes the contactor 112 to connect the destination phase (either 110B or 110C) of the three phase trunk to lateral single-phase line 108. The power electronics enclosure 106 may be bypassed by opening the three phase breaker 114 and the single phase breaker 116 at step 164, thus completing the phase swap sequence at step 166.

It should be noted that system 100 could also be realized with Medium Voltage AC-DC-AC converter topologies, many of which would allow for the elimination of the transformers in exchange for more or higher voltage rated IGBTs and diodes.

While better than the manual approach of the prior art, there may be disadvantages of using system 100. A principal disadvantage is that it is a solid state system (i.e. power is processed via power electronics), which has a multitude of components and subsystems (logic circuits, power supplies, gate drivers, etc.). Moreover, the packaging of power electronics systems for siting and installation outside of a substation is challenging.

Figure 3:
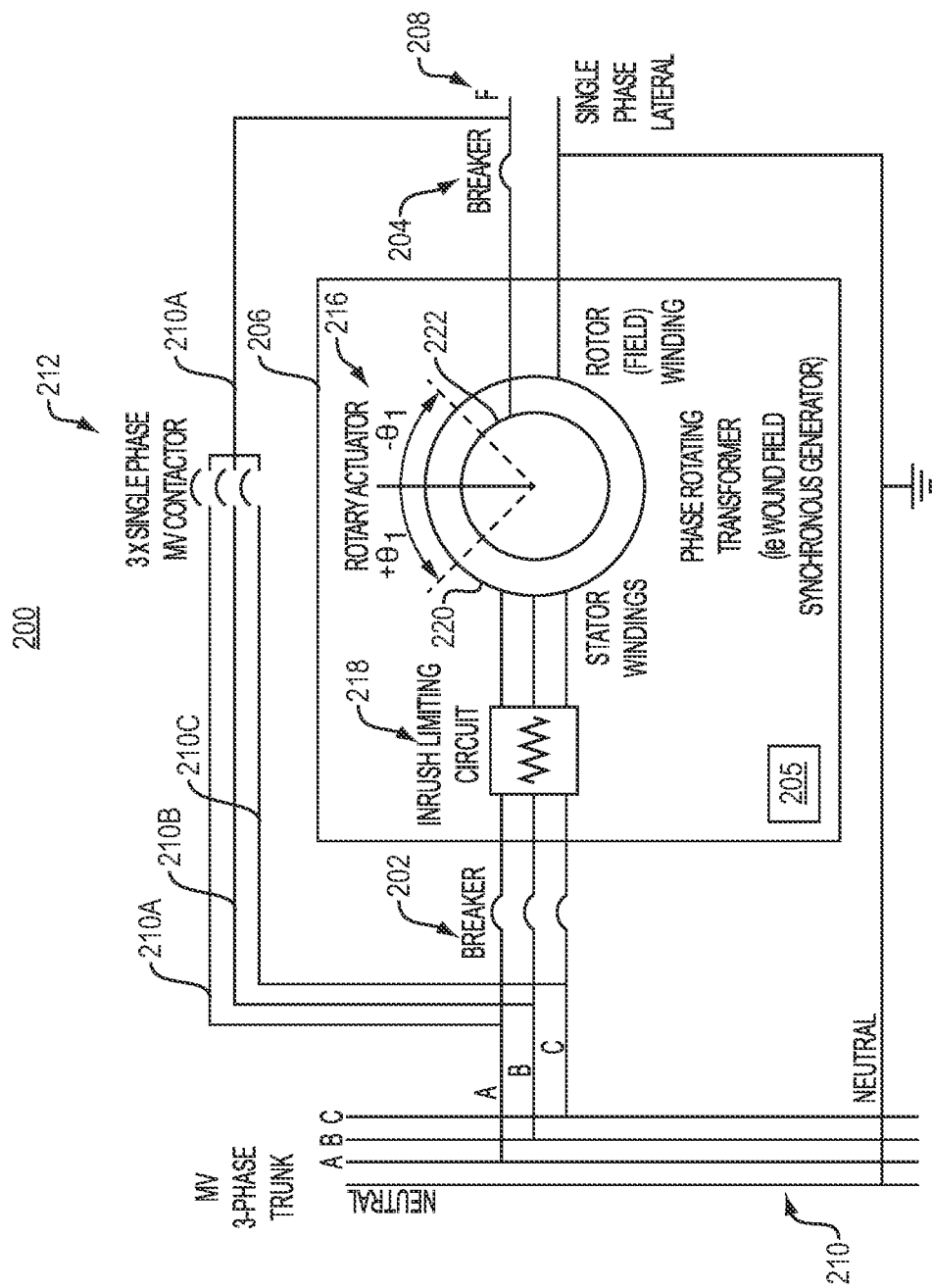
FIG. 3 is a schematic diagram of another embodiment of the invention using a phase rotating transformer to achieve load re-balancing.

Another embodiment of a system and method to hot swap a single phase lateral line from the nominal "source" phase to another phase of the three-phase trunk without interruption, is described below with regard to FIG. 3. Shown in FIG. 3 is a 3-phase to 1-phase phase rotating transformer system 200, with circuit breakers 202 and 204 at the three-phase trunk line 210 interface and the single-phase lateral 208 interface, respectively. A phase rotating transformer enclosure 206 of phase rotating transformer system 200 is normally bypassed by placing breakers 202 and 204 in the normally open position, and the single-phase lateral line 208 connected to the proper phase of three-phase trunk 210 via one of the MV contactors 212. For example, single phase lines 210A, 210 B and 210C of three-phase trunk 210 are connected to contactor 212 and one of the single phases, in this case phase 210A, is connected to single phase lateral line 208. If it is determined that single phase line 210A is overloaded and the three-phase trunk should be re-balanced, the phase connected to single phase lateral line 208 may be changed from phase 210A to either phase 210B or 210C, depending on which phase has sufficient capacity.

A central component of the embodiment shown on FIG. 3 is an electromechanical device, referred to as a phase rotating transformer 216. The phase rotating transformer 216 is connected between three-phase breaker 202 and a single-phase breaker 204. An optional in-rush current limiting circuit 218, may be used to prevent high three phase current draw on the stator winding 220 and rotor winding 222 of phase rotating transformer 216 when breaker 202 is closed. Phase rotating transformer 216 may be implemented as a wound field synchronous generator, for example, whose rotor angle is controlled to vary the coupling between one of the three phases of the stator winding 220 to the single phase rotor winding 222, while the stator and rotor windings are energized (i.e. the lateral phase may be "hot" swapped). Overall operation of 3-phase to 1-phase phase rotating transformer system 200 is controlled by controller 205 in a manner similar to that of controller 105 of 3-phase to 1-phase AC-DC-AC power converter system 100, FIGS. 2A and 2B.

As the mechanical shaft angle, θ, (and the electrical phase angle) of phase rotating transformer 216 is changed by a rotary actuator (not shown), the field winding, F, and the single-phase lateral 208, are coupled controllably to phases A, B, and to C of three-phase trunk 210. The transformer coupling properties of a wound field rotor synchronous generator are well established. What is uniquely recognized herein is the control of the rotor angle to provide a smooth and continuous coupling of power from the source voltages to the lateral during a hot-swapping process. It should be noted that synchronous generators are commonly manufactured with 2, 4, 6, or 8 poles. For each these designs, 120 degrees of electrical rotation respectively corresponds to 120, 60, 30, 15 degrees of rotor mechanical rotation.

As is well known to those skilled in the art of design or selection of rotary electromagnetic machines (motors and generators), the selection of the number of poles allows the machine designer to exchange, at the "mechanical port" (i.e. the shaft), in an inverse proportional manner, lowering the required angular displacement in exchange for higher required torque, assuming the required mechanical power is constant. This is akin to selecting a different gear ratio in an automotive transmission or a different turns ratio in an electrical transformer. At the "mechanical port" (the shaft) of an electric machine, the two quantities being exchanged are torque and angular displacement, as opposed to voltage in a fixed transformer, though the product of the two quantities remains constant. For example, with a 6 pole synchronous generator, the rotor would only need to rotate 30 mechanical degrees (i.e. 1/12 of a full 360 degree rotation) to change the field coupling, F, from phase A to phase B. However, the required torque increases by a factor of twelve (12).

Figure 4:
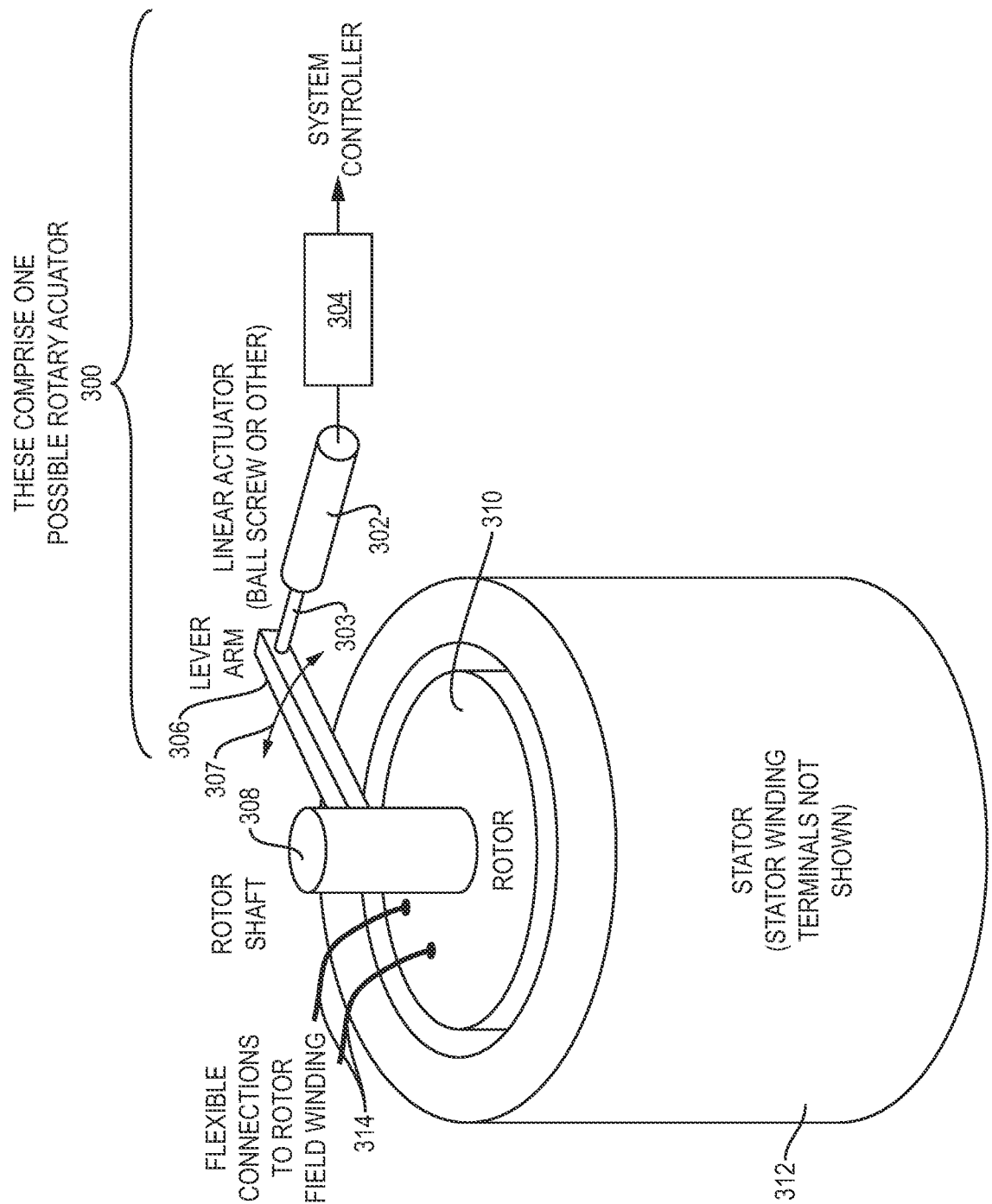
FIG. 4 is a perspective view of a rotary actuator for rotating the rotating transformer of FIG. 3.

The mechanical shaft angle, θ, may be adjusted (over a range of +/−θ) by means of a mechanical rotary actuator 300, described with regard to FIG. 4. The mechanical rotary actuator preferably has the following features: 1) it is controllable over a range of +/−120 electrical degrees, and 2) it has zero power holding force (torque). Mechanical rotary actuator 300 may be configured in various ways known to those skilled in the art. One such implementation is depicted to include a linear actuator 302 (ball screw, worm drive or the like) having an actuator arm 303, which may be extended and retracted under the control of control device 304 based on control signals from the system level controller 205 (FIG. 3). Actuator arm 303 is mechanically connected to a first end of lever arm 306 and the second end of lever arm 306 is fixed to rotor shaft 308 of rotor 310. When the actuator arm 303 is extended, it causes lever arm 306 to move in a counter-clockwise direction (as indicated by arrow 307) and when it is retracted it causes lever arm 306 to move in the clockwise direction. When lever arm 306 is rotated, it in turn rotates rotor shaft 308 and rotor 310 over a full range of +/−θ, where 0 degrees, +θ degrees, and −θ degrees, each correspond to one of electrical phases A, B, and C of the three phase trunk. In these three positions, the respective phase of the primary windings of the stator 312 are magnetically coupled to the rotor field winding in rotor 310 and the single phase electrical current from the rotor field winding is output via flexible electrical connections 314 to single phase breaker 204 and lateral 208 of FIG. 3.

The phase rotating transformer in combination with the mechanical rotary actuator according to an aspect of the invention, has the ability to hot swap an entire single phase lateral line (and the electrical loads it is feeding) from a nominal "source" phase to either of the other two "destination" phases of a three-phase trunk, without interruption of the voltage. In other words, the voltage of the single lateral phase would maintain a smooth, near-sinusoidal shape during the swap event to prevent "load drop"—i.e. motors and other devices from tripping offline if the lateral voltage were to "jump" very abruptly from source to destination voltage. Moreover, the system would continue to supply (or absorb) real power to the load on that lateral during the swap event.

Figure 5:
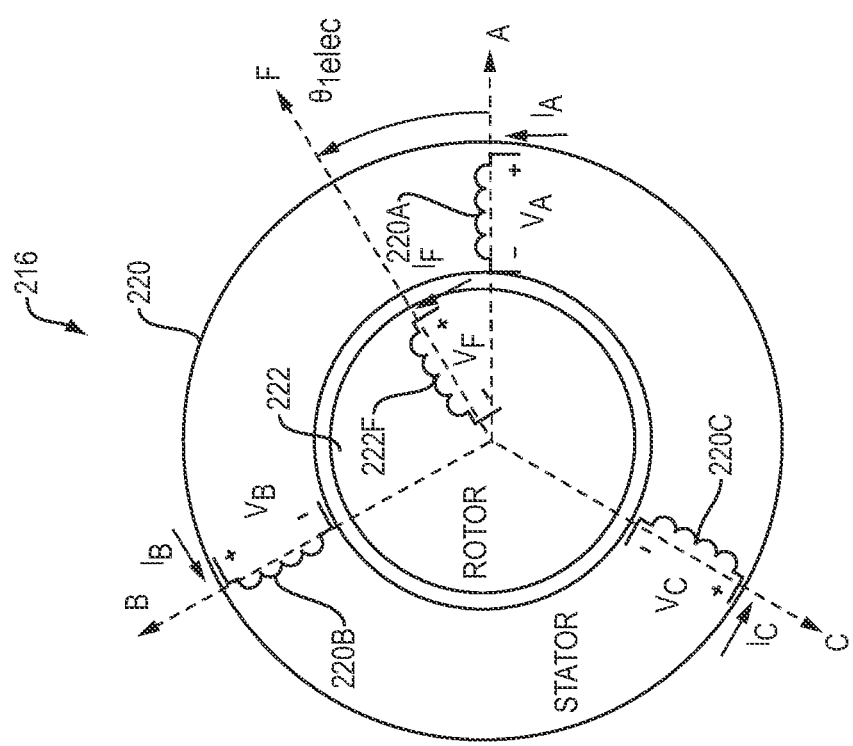
FIG. 5 is a simplified coupling model of the phase rotating transformer of FIG. 3.

The operation of phase rotating transformer 216 of FIG. 3 is depicted by way of a simplified coupled winding model 300 in FIG. 5. In this simplified model the phase windings are combined in one angular location on the stator or rotor. In practical realization in motors and generators, these windings are distributed around each of these structures, and the magnetic coupling is not binary (i.e. not on/off), but rather it progresses. However, this model captures the behavior of the machine when viewed externally as operating in a binary manner.

In model 300, stator windings 220 are shown to include phase A winding 220A, phase B winding 220B, and phase C winding 220C, each having a voltage across the windings and a current passing through the windings, respectively, $V_A/I_A$, $V_B/I_B$, and $V_C/I_C$. The stator windings are displaced about the full circumference of the stator and are mechanically spaced approximately 120 degrees between each phase, which would be the arrangement for a 2-pole machine, as described above. Rotor field winding 222 comprises single phase lateral windings 222F, which has a voltage across the windings and a current passing through the windings, $V_F/I_F$.

If, for example, the single phase lateral windings 222F were magnetically coupled to phase A winding 220A, the lateral windings 22F would be mechanically aligned with the phase A winding. And, phase A 220A which is coupled to Phase A of three-phase trunk 210 would be powering single-phase lateral 208. If the phase A trunk loading were to become unbalanced with phases B and/or C of three-phase trunk 210, then phase rotating transformer 216 could be activated to hot swap the single phase lateral windings 222F to phase B or C by changing the coupling of single phase lateral windings 222F to either phase B winding 220B or phase C winding 220C. Continuing to refer to FIG. 5, lateral windings 222F are shown to be mechanically displaced from phase A winding 220A by mechanical shaft angle, $θ_{1elec}$, in the rotational direction via a mechanical rotary actuator (not shown) toward phase B winding 220B, depicting the hot swapping of the phase lateral windings 222F from phase A winding 220A to the phase B winding 220B, in mid-process.

The system is intended to be used in transient duty or short durations (~0.5 to 10 seconds for "hot swap" depending on requirements for rate of frequency change to keep load from dropping). However, unlike the solid state power converter of 106, the electrical power flow path in the phase rotating transformer of 216 is comprised of copper and iron and has no semiconductor devices. As such, it can tolerate very high currents (5× nominal or more) for several seconds or more. This is important for the design of a (phase rotating) transformer, as it allows the sizing of the unit to take advantage of the high ratio of peak current/nominal current allowable for transformers and generators and reduces the overall cost of this approach.

Figure 6:
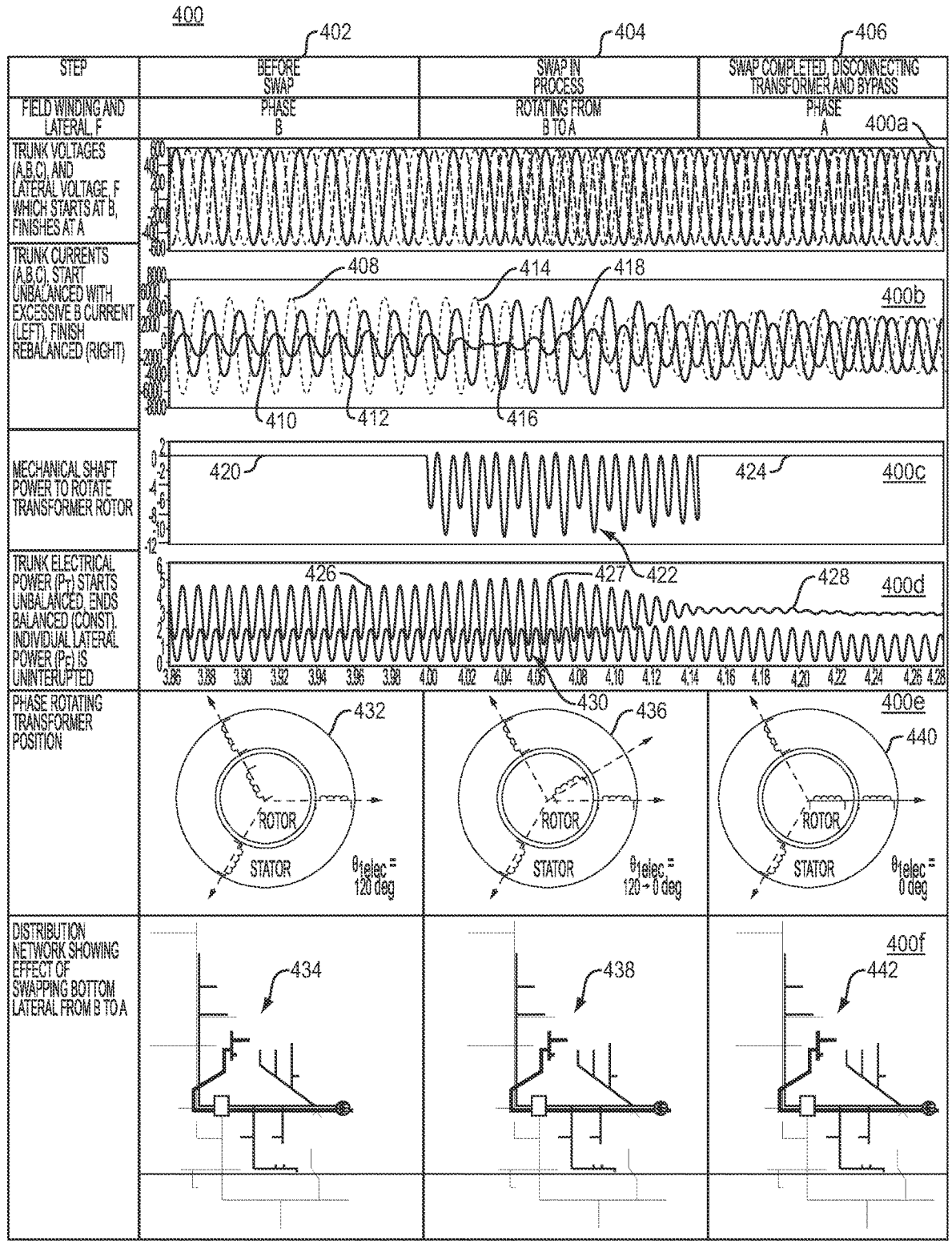
FIG. 6 diagram depicting the hot swap phase sequence according to an aspect of the invention.

The hot swapping process of changing the single phase lateral 18b of FIG. 1, which is initially connected to trunk phase B, to trunk phase A, using the 3-phase to 1-phase phase rotating transformer system 200, is depicted in table 400 shown in FIG. 6. Waveforms 400a depict trunk voltages (A, B, C) and lateral or field winding voltage F during time period 402 (before the hot swap), time period 404 (during the hot swap), and time period 406 (swap completed). Before hot swap 402, within the set of voltages in 400a, the dashed line showing the field winding voltage F tracks with the phase B voltage. During hot swap 404, within the set of voltages in 400a, the field winding voltage F processes from overlapping with phase B voltage at the start of 404 to overlapping with the phase A voltage at the end of 404. At the swap completion 406, within the set of voltages in 400a, the field winding voltage F tracks with the phase A voltage.

Waveforms 400b depict the trunk currents (A, B, C) which start in time period 402 in an unbalanced state, with an excessive amount of B phase current 408 and a lesser amount of A phase current 410 as compared to the amount of C phase current 412, which is at a desired level. In time period 404, during the hot swap, the C phase current increases at 414, while the A phase current remains at about the same magnitude, but has a short time frame when it is not oscillating and is in a DC state at 416 and then returns to an oscillating state at 418. In time period 406, when the swap is completed all three phases are shown to have approximately the same amount of current as was originally on C phase in period 402. Clearly evident from this process is that the currents are now more balanced among the three phases, with no one phase having excessive loading compared with either of the other two.

Waveform 400c shows the mechanical shaft power, which in periods 402 and 406, before and after hot swapping, respectively, are shown to be zero in regions 420 and 424. During the hot swapping process, time period 404, there is shown a negative average torque and power applied to the mechanical shaft (in region 422) in order to rotate the shaft in the clockwise direction, so that the field winding is moved from being aligned with phase B to being aligned with phase A.

Waveforms 400d depict the three phase trunk electrical power being initially unbalanced (oscillatory) in regions 426 and 427 during time periods 402 and 404 (before and during hot swapping) and balanced (nearly constant) in region 428 during time period 406 when the hot swap is complete. The single phase lateral power 430 is oscillatory at all times (which is an essential property of single phase power systems) but has nearly constant average power and remains uninterrupted throughout the swap sequence, proceeding through 402, to 404 and through 406.

In each of time periods 402, 404, and 406, machine winding models are shown in portion 400e of table 400 and lateral phase connections in the distribution network are shown in portion 400f of table 400. As shown in model 432 and distribution network 434, the field winding of the phase rotating transformer and the single phase lateral 18b (FIG. 1) are connected to trunk phase B during time period 402. During time period 404 (hot swapping), the single-phase lateral of the distribution network 438 is connected exclusively to the field winding of the phase rotating transformer, which provide any and all current to these loads. The field winding of model 436 is mechanically rotated in alignment from phase B to phase A, as described previously. And, during time period 406, model 440 and distribution network 442, the field winding of the phase rotating transformer and the single phase lateral 18b (FIG. 1) are connected to trunk phase A and the hot swap is complete.

Figure 7:
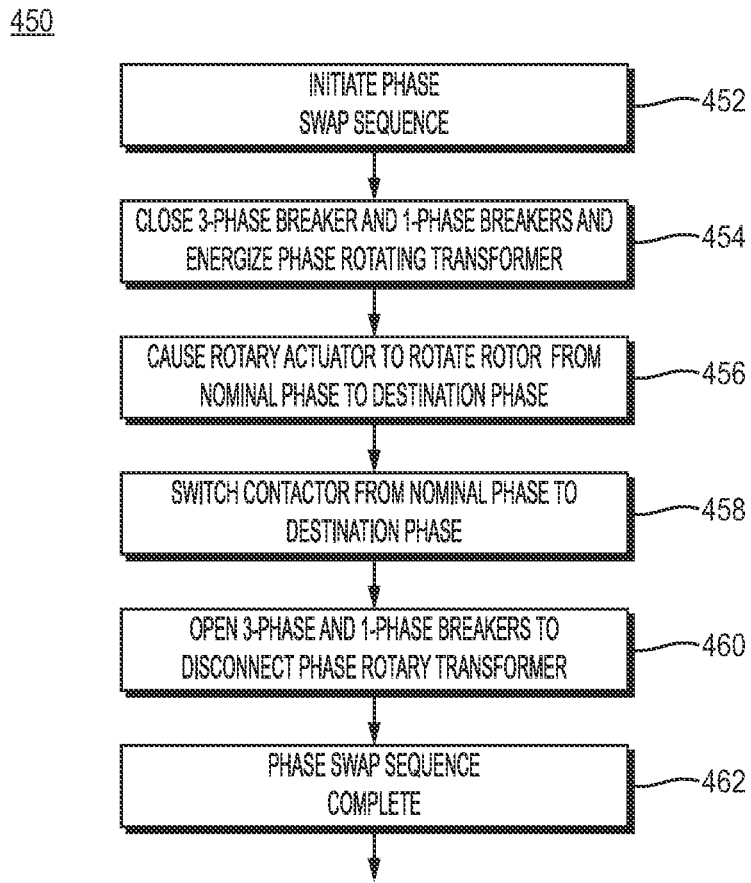
FIG. 7 is a flow chart illustrating the operation of the control system for the load re-balancing system of FIG. 4.

In FIG. 7 there is shown flow chart 450, which describes the operation of controller 205 of phase rotating transformer system 200, FIG. 3, when a phase swap is desired/required, from phase B to phase A, as shown in FIG. 6. Controller 205, as shown in step 552, initiates the phase swap sequence. In the current state (i.e. before phase swap), one of the 3 single phase contactors in contactor 212 is in the closed position, providing a nominal connection of the output line 208 to one of the three phases, in this example it is connected to B phase from the trunk 210B. The swap process proceeds to step 454 when controller 205 causes phase rotating transformer enclosure 206 to be energized and connected to single phase lateral 208 by closing three phase breaker 202 and single phase breaker 204. In step 456, rotary actuator 300 causes rotor field winding to rotate to 120 degrees to change magnetic coupling from phase B to phase A (destination phase). In step 458, controller 205 causes contactor 212 to switch from nominal phase (phase B) and connect to the destination phase (either 210A) of the three phase trunk to lateral single-phase line 208. Then, in step 460 the three phase breaker 202 and single phase breaker 204 are opened and the phase rotating transformer enclosure 206 is de-energized and disconnected, thus completing the phase swap sequence at step 462.

Figure 8:
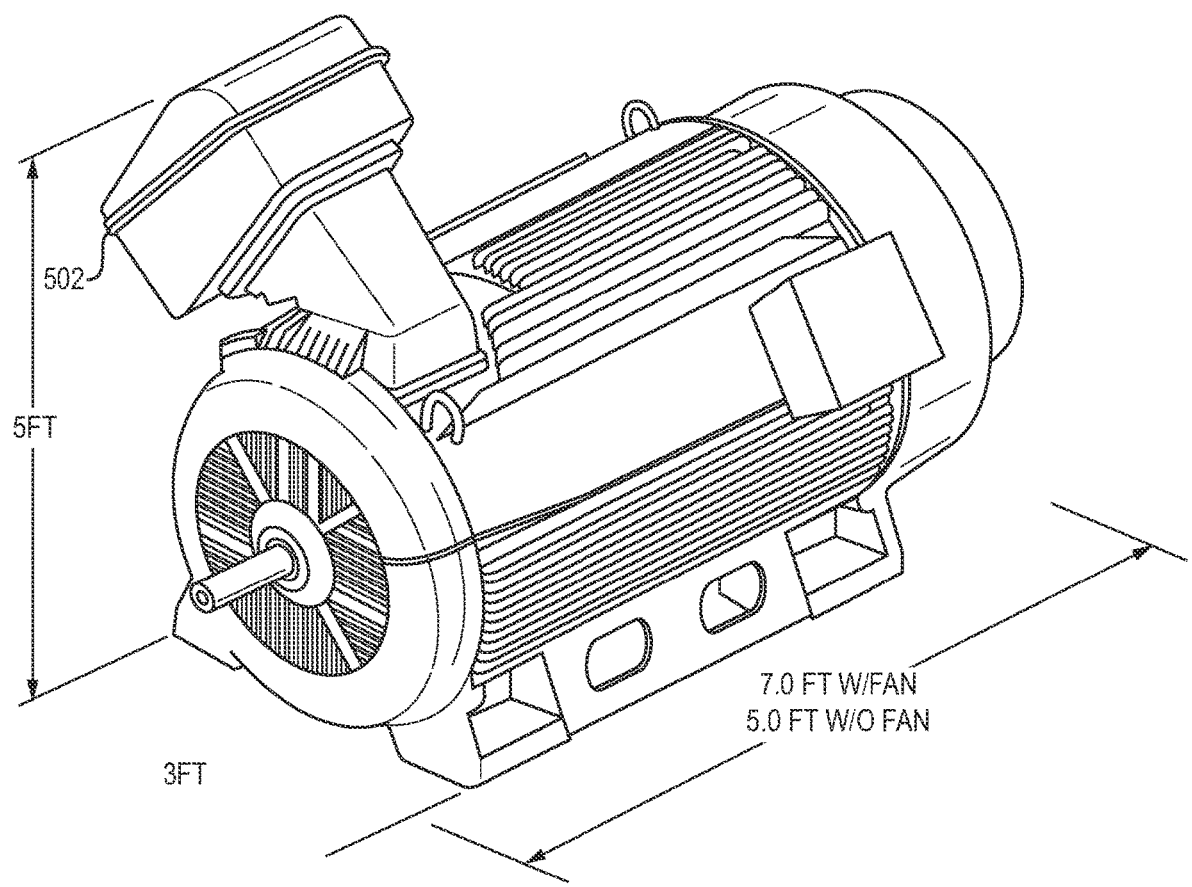
FIG. 8 is a perspective view of an exemplary induction motor that may be used as a phase rotating transformer according to an aspect of the invention.
Figure 9:
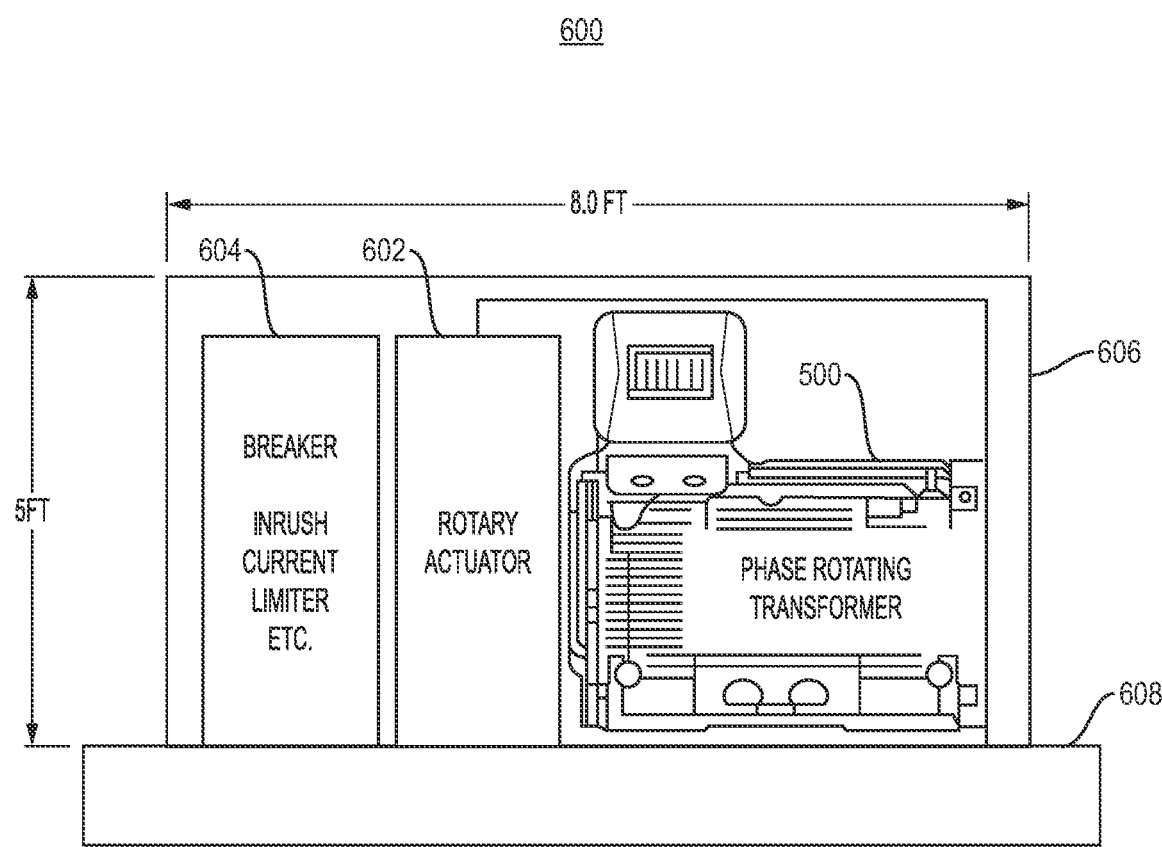
FIG. 9 is a cross-sectional view of a pad-mounted, load re-balancing system according to an aspect of the invention.

By way of example only, phase rotating transformer 216 sizing may be determined as follows. As noted previously, the iron and copper based phase rotating transformer used in a phase re-balancer can operate and withstand currents approximately 5 times nominal (nameplate) ratings for up to a minute or more required for swap sequence. As such, for an example application servicing a single-phase lateral having a 1200 kW loading, a three-phase synchronous generator (i.e. phase rotating transformer) with a nameplate rating of 400 kW may be used. A 440 kW 8-pole squirrel cage induction motor (generator) 500, FIG. 8, with 6.6 kV medium voltage stator may be used a proxy for a physical size of three-phase synchronous generator (i.e. phase rotating transformer 216). Generator 500 would have roughly the equivalent magnetic material (iron) and size needed for this application, however, as shown it often includes a forced air fan 502, which would not be needed for the phase rotating transformer according to this invention. The dimensions of generator 500 are approximately 3 ft, in width by 7 ft, in length by 5 ft in height with the fan. Without the fan, the height would be reduced by approximately two feet.

Given the above dimensions for generator 500, the system could be desirably configured as a pad mount system which would be sited outside of a substation, at the point where the single phase lateral branches from the three phase trunk (i.e. along the distribution feeder where space will likely be limited). As noted above, the forced air fan 502 would ideally not be included to reduce the overall size of the phase rotating transformer. In addition, three-phase synchronous generator 500, would need to be modified to support a greater stator voltage, up to 15 kV class for distribution feeders. And, rotor field winding, should be further modified to operate at medium voltage, specifically the line-to-neutral equivalent for 15 kV LL class system to enable direction connection, and include multiple taps. If a low voltage rotor field were to be used (say 277V or 400V LN), the system would require a one-phase low voltage to medium voltage step up transformer for stepping up the low voltage output of the field winding to the medium voltage of the single phase lateral branch. Direct (flexible) connections to field winding terminals, rather than slip-rings that are common in motors and generators, would be beneficial.

A concept drawing of a load balancing system 600 according to an aspect of the invention is shown in FIG. 7 to include phase rotating transformer 500 of FIG. 6, rotary actuator 602, which would be interconnector to the shaft of phase rotating transformer 500, in order to rotate the rotor and field windings to hot swap phases connected to the stator. There is also a breaker unit 604 which includes a current inrush limiter. The foregoing components in addition to other components, such as controller circuitry, may be included within enclosure 606 which may be mounted on pad 608.

While the foregoing description enables one of ordinary skill to make and use what is considered presently to be the best mode of the system and method for load balancing on a multi-phase power line connected to a single phase lateral power line, those of ordinary skill will understand and appreciate the existence of variations, combinations, and equivalents of the specific embodiments and examples herein. The above-described embodiments of the present invention are intended to be examples only. Alterations, modifications and variations may be effected to the particular embodiments by those of skill in the art without departing from the scope of the invention, which is defined solely by the claims appended hereto.

The invention is therefore not limited by the above described embodiments and examples, embodiments, and applications within the scope and spirit of the invention claimed as follows.

We claim:

1. A system for load balancing on a multi-phase power line connected to a single phase lateral power line, the system comprising:
    a phase rotating transformer having a stator and a rotor; wherein the stator includes a plurality of primary coils, each primary coil configured to be connected to one phase of the multi-phase power line and wherein the rotor includes a secondary coil configured to be connected to the single phase lateral power line;
    a rotary actuator operably connected to the rotor; and
    a controller configured to cause the rotary actuator to rotate the rotor to selectively electromagnetically couple the secondary coil with each of the plurality of primary coils, so as to enable electrical connection of each phase of the multi-phase power line with the single phase lateral power line.

2. The system of claim 1 wherein the multi-phase power line comprises three phases.

3. The system of claim 1 wherein the phase rotating transformer comprises a wound field synchronous generator.

4. The system of claim 1 wherein when the controller is configured to cause the rotary actuator to rotate the rotor to selectively electromagnetically couple the secondary coil with each of the plurality of primary coils, while the plurality of primary coils of the stator are energized.

5. The system of claim 4 wherein the controller is configured to rotate the rotary actuator and the secondary coil on the rotor from one of the primary coils to another of the primary coils in approximately 0.2 seconds or less.

6. The system of claim 1 wherein the controller is configured to rotate the rotary actuator across a range of +/−120 degrees.

7. The system of claim 1 wherein the rotary actuator comprises a worm gear driven by an electric motor.

8. The system of claim 1 further including a current in-rush limiting circuit disposed between the multi-phase power line and the primary coils of the stator of the phase rotating transformer.

9. The system of claim 1 further including a multi-phase by-pass circuit having a multi-phase to single-phase contactor device connected electrically in parallel to the phase rotating transformer.

10. A method for load balancing on a multi-phase power line connected to a single phase lateral power line, the method comprising:
    providing a phase rotating transformer having a stator and a rotor; wherein the stator includes a plurality of primary coils, each primary coil configured to be connected to one phase of the multi-phase power line and wherein the rotor includes a secondary coil configured to be connected to the single phase lateral power line;
    providing a rotary actuator operably connected to the rotor; and
    causing the rotary actuator to rotate the rotor to selectively change an electromagnetic coupling of the secondary coil from a first of the plurality of primary coils to a second of the plurality of primary coils, so as to change the electrical connection between the multi-phase power line and the single phase lateral power line from a first phase to a second phase.

11. The method of claim 10 wherein the multi-phase power line comprises three phases.

12. The method of claim 10 wherein the phase rotating transformer comprises a wound field synchronous generator.

13. The method of claim 10 wherein when the rotary actuator is caused to rotate the rotor to selectively change the electromagnetic coupling of the secondary coil from a first of the plurality of primary coils to a second of the plurality of primary coils, the plurality of primary coils of the stator are energized.

14. The method of claim 13 wherein the rotary actuator causes the rotor and the secondary coil on the rotor to rotate from one of the primary coils to another of the primary coils in approximately 0.2 seconds or less.

15. The method of claim 10 wherein the rotary actuator is capable of causing the rotor to rotate across a range of +/−120 degrees.

16. The method of claim 10 wherein the rotary actuator comprises a worm gear driven by an electric motor.

17. The method of claim 10 further including disposing a current in-rush limiting circuit between the multi-phase power line and the primary coils of the stator of the phase rotating transformer.

18. The method of claim 10 further including disposing a multi-phase by-pass circuit having a multi-phase to single-phase contactor device electrically in parallel to the phase rotating transformer.

19. A system for load balancing on a multi-phase power line connected to a single phase lateral power line, the system comprising:
    a contactor configured to selectively connect each phase of the multi-phase power line to the single phase lateral power line; wherein in a normal operating state, the contactor is configured to connect a first phase of the multi-phase power line to the single phase lateral power line and during a phase change state, the contactor is configured to change connection from the first phase to a second phase of the multi-phase power line;
    a power electronics enclosure, having an input and an output, connected in parallel with the contactor between the multi-phase power line and the single phase lateral power line; wherein, during the phase change state, the input is configured to be connected to the multi-phase power line and the output is configured to be connected to the single phase lateral power line; and wherein in the normal operating state, the input is configured to be disconnected from the multi-phase power line and the output is configured to be disconnected from the single phase lateral power line; and
    a controller, during the phase change state, configured to:

connect the input of the power electronics enclosure to the multi-phase power line and connect the output of the power electronics enclosure the single phase lateral power line;

cause the power electronics enclosure to output a voltage to the single phase lateral power line aligned with the first phase;

cause the power electronics enclosure to output the voltage to the single phase lateral power line aligned with the second phase;

cause the contactor to change connection from the first phase of the multi-phase power line to the second phase of the multi-phase power line; and disconnect the input of the power electronics enclosure from the multi-phase power line and disconnect the output of the power electronics enclosure from the single phase lateral power line.

20. A method for load balancing on a multi-phase power line connected to a single phase lateral power line, the method comprising:

providing a contactor configured to selectively connect each phase of the multi-phase power line to the single phase lateral power line; wherein in a normal operating state, the contactor is configured to connect a first phase of the multi-phase power line to the single phase lateral power line and during a phase change state, the contactor is configured to change connection from the first phase to a second phase of the multi-phase power line;

providing a power electronics enclosure, having an input and an output, connected in parallel with the contactor between the multi-phase power line and the single phase lateral power line; wherein, during the phase change state, the input is configured to be connected to the multi-phase power line and the output is configured to be connected to the single phase lateral power line; and wherein in the normal operating state, the input is configured to be disconnected from the multi-phase power line and the output is configured to be disconnected from the single phase lateral power line; and during the phase change state:

connecting the input of the power electronics enclosure to the multi-phase power line and connecting the output of the power electronics enclosure to the single phase lateral power line;

causing the power electronics enclosure to output a voltage to the single phase lateral power line aligned with the first phase;

causing the power electronics enclosure to output the voltage to the single phase lateral power line rotated to align with the second phase;

causing the contactor to change connection from the first phase of the multi-phase power line to the second phase of the multi-phase power line; and disconnecting the input of the power electronics enclosure from the multi-phase power line and disconnecting the output of the power electronics enclosure from the single phase lateral power line.

21. A system for load balancing on a multi-phase power line connected to a single phase lateral power line, the system comprising:

a contactor configured to selectively connect each phase of the multi-phase power line to the single phase lateral power line; wherein in a normal operating state, the contactor is configured to connect a first phase of the multi-phase power line to the single phase lateral power line and during a phase change state, the contactor is configured to change connection from the first phase to a second phase of the multi-phase power line;

an enclosure, having an input and an output, connected in parallel with the contactor between the multi-phase power line and the single phase lateral power line; wherein, during the phase change state, the input is configured to be connected to the multi-phase power line and the output is configured to be connected to the single phase lateral power line; and wherein in the normal operating state, the input is configured to be disconnected from the multi-phase power line and the output is configured to be disconnected from the single phase lateral power line; and a controller, during the phase change state, configured to:

connect the input of the enclosure to the multi-phase power line and connect the output of the enclosure to the single phase lateral power line;

cause the enclosure to output a voltage to the single phase lateral power line initially aligned with the first phase and then rotated to align with the second phase;

cause the contactor to change connection from the first phase of the multi-phase power line to the second phase of the multi-phase power line; and disconnect the input of the enclosure from the multi-phase power line and disconnect the output of the enclosure from the single phase lateral power line.

22. The system of claim 21 wherein the enclosure comprises one of a power electronics enclosure or a phase rotating transformer enclosure.

23. A method for load balancing on a multi-phase power line connected to a single phase lateral power line, the method comprising:

providing a contactor configured to selectively connect each phase of the multi-phase power line to the single phase lateral power line; wherein in a normal operating state, the contactor is configured to connect a first phase of the multi-phase power line to the single phase lateral power line and during a phase change state, the contactor is configured to change connection from the first phase to a second phase of the multi-phase power line;

providing an enclosure, having an input and an output, connected in parallel with the contactor between the multi-phase power line and the single phase lateral power line; wherein, during the phase change state, the input is configured to be connected to the multi-phase power line and the output is configured to be connected to the single phase lateral power line; and wherein in the normal operating state, the input is configured to be disconnected from the multi-phase power line and the output is configured to be disconnected from the single phase lateral power line; and during the phase change state:

connecting the input of the enclosure to the multi-phase power line and connecting the output of the enclosure the single phase lateral power line;

causing the enclosure to output a voltage to the single phase lateral line initially aligned with the first phase and then rotated to align with the second phase;

causing the contactor to change connection from the first phase of the multi-phase power line to the second phase of the multi-phase power line; and disconnecting the input of the enclosure from the multi-phase power line and disconnecting the output of the enclosure from the single phase lateral power line.

24. The method of claim 23 wherein the enclosure comprises one of a power electronics enclosure or a phase rotating transformer enclosure.

\* \* \* \* \*